(12) United States Patent
Hsu et al.

(10) Patent No.: US 8,279,535 B2
(45) Date of Patent: Oct. 2, 2012

(54) IMAGE CAPTURE LENS MODULES AND IMAGE CAPTURE SYSTEMS

(75) Inventors: Yun-Chiang Hsu, Taoyuan Country (TW); Jau-Jan Deng, Taipei (TW)

(73) Assignees: Omnivision Technologies, Inc., Santa Clara, CA (US); VisEra Technologies Company Limited, Hsinchu (TW)

( * ) Notice: Subject to any disclaimer, the term of this patent is extended or adjusted under 35 U.S.C. 154(b) by 511 days.

(21) Appl. No.: 12/572,782

(22) Filed: Oct. 2, 2009

(65) Prior Publication Data
US 2011/0080513 A1 Apr. 7, 2011

(51) Int. Cl.
*G02B 13/18* (2006.01)
(52) U.S. Cl. ...................................... 359/717
(58) Field of Classification Search .................. 359/754, 359/756, 796, 797, 785, 791, 784
See application file for complete search history.

(56) References Cited

U.S. PATENT DOCUMENTS

| | | | |
|---|---|---|---|
| 6,813,100 B2 | 11/2004 | Yamaguchi et al. | |
| 6,977,779 B2 | 12/2005 | Shinohara | |
| 7,457,053 B2 * | 11/2008 | Oh et al. | 359/793 |
| 7,796,349 B2 * | 9/2010 | Deng et al. | 359/793 |

* cited by examiner

*Primary Examiner* — James Greece
(74) *Attorney, Agent, or Firm* — Muncy, Geissler, Olds & Lowe, PLLC

(57) ABSTRACT

Image capture lens modules and image capture systems are presented. An image capture lens module includes a first compound lens with a first lens element, a second lens element, and a third lens element arranged in sequence from an object side to an image side. A second compound lens includes a fourth lens element, a fourth lens element, and a fifth lens element arranged in sequence from an object side to an image side. A curvature radius of the first lens element is positive, a curvature radius of the third lens element is negative, a curvature radius of the fourth lens element is negative, and a curvature radius of the sixth lens element is negative. An abbe number of the first lens element exceeds 55 and an abbe number of the third lens element is less than 30.

9 Claims, 11 Drawing Sheets

IMAGE CAPTURE LENS MODULES AND IMAGE CAPTURE SYSTEMS

BACKGROUND OF THE INVENTION

1. Field of the Invention

The invention relates to image capture lens modules, and more particularly to, high performance wafer-level packaged image capture lens modules and image capture systems.

2. Description of the Related Art

Digital cameras utilizing high-resolution electronic imaging sensors typically require high resolution optical components such as image capture lens modules. The design and manufacturing of camera modules for portable electronic products is extremely challenging. Some pervasive factors include: high production volume, constant price erosion, size limitations and changing performance and functionality requirements.

Image capture lenses on a digital camera module that focus a scene onto an imager can be as few as one lens on a digital camera module, or as many as four in a digital camera module with mega pixel resolution. Usually, the lenses are plastic, due to lower costs. However, higher quality digital cameras sometime use glass for the first lens because of its superior optical properties.

U.S. Pat. No. 6,813,100, the entirety of which is hereby incorporated by reference, discloses a miniature image-capturing lens simply consisting of two separate lenses which are smaller and are optimally corrected for aberration. U.S. Pat. No. 6,977,779, the entirety of which is hereby incorporated by reference, discloses an imaging lens consisting of three lens components of positive, negative, and positive refractive power, in order from the object side. Still, Japanese Patent Application Laid-Open No. 2008-287006, the entirety of which is hereby incorporated by reference, discloses an imaging lens with aberration correction, a short optical length, a secured back focus, and steady optical performance in a high temperature environment.

FIG. 1 is a schematic view illustrating a configuration of a conventional imaging lens. Referring to FIG. 1, an imaging lens includes a first diaphragm S1, a first junction type compound lens 10, a second diaphragm S1, and a second junction type compound lens 20 all of which are arranged in sequence from an object side to an image side. The first junction type compound lens 10 includes a first lens L1, a second lens L2, and a third lens L3 arranged in sequence from an object side to an image side. The second junction type compound lens 20 includes a fourth lens L4, a fifth lens L5, and a sixth lens L6 arranged in sequence from an object side to an image side. A cover glass 30 is inserted between the second junction type compound lens 20 and an image sensing element 40. Conventionally, the imaging lens is packaged using wafer level packaging technology. There are, however, some problems for the conventional wafer-level packaged image capture lens module, such as exacerbated optical performances, limitations to substrate and lens replication process and alignment inaccuracy of the optical center of the lens module. Moreover, the conventional two-piece wafer-level packaged lens module is not good enough for integration with two megapixel (2M) or three megapixel (3M) CMOS image sensor chips.

BRIEF SUMMARY OF THE INVENTION

Embodiments of the invention provide an image capture lens module, comprising: a first compound lens with a first lens element, a second lens element, and a third lens element arranged in sequence from an object side to an image side; a second compound lens with a fourth lens element, a fourth lens element, and a fifth lens element arranged in sequence from an object side to an image side; and a spacer between the first compound lens and the second compound lens, wherein: the first compound lens, the second compound lens and the cover glass are arranged in sequence from an object side to an image side, a curvature radius of the first lens element is positive, a curvature radius of the third lens element is negative, a curvature radius of the fourth lens element is negative, and a curvature radius of the sixth lens element is negative, and an abbe number of the first lens element exceeds 55 and an abbe number of the third lens element is less than 30.

Embodiments of the invention further provide an image capture system, comprising: a wafer-level packaged image capture lens module and a CMOS image sensor chip, wherein the image capture lens module comprises: a first compound lens with a first lens element, a second lens element, and a third lens element arranged in sequence from an object side to an image side; a second compound lens with a fourth lens element, a fourth lens element, and a fifth lens element arranged in sequence from an object side to an image side; a spacer between the first compound lens and the second compound lens; and a cover glass for an image sensor positioned behind the second compound lens, wherein: the first compound lens, the second compound lens and the cover glass are arranged in sequence from an object side to an image side; a row decoder and a column decoder coupled to the image sensor device respectively to address one or multiple pixels and to retrieve data from selected pixels; an analog-to-digital converter (ADC) is coupled to the column decoder, operating to convert the analog electrical representation into a digital image; and an output buffer configured to store digital image data converted by the analog-to-digital converter: a curvature radius of the first lens element is positive, a curvature radius of the third lens element is negative, a curvature radius of the fourth lens element is negative, and a curvature radius of the sixth lens element is negative, and an abbe number of the first lens element exceeds 55 and an abbe number of the third lens element is less than 30.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
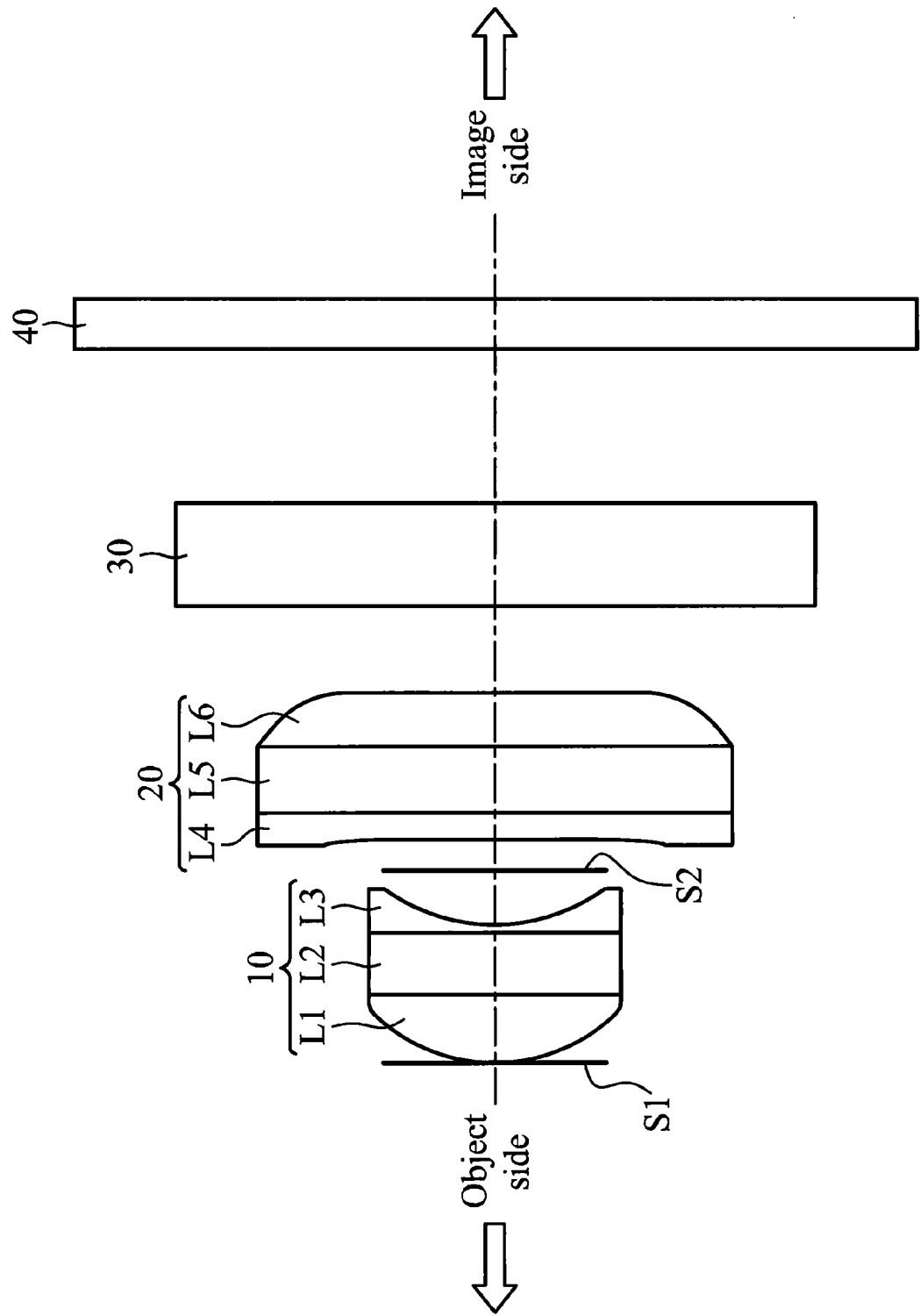
FIG. 1 is a schematic view illustrating a configuration of a conventional imaging lens.
Figure 2A:
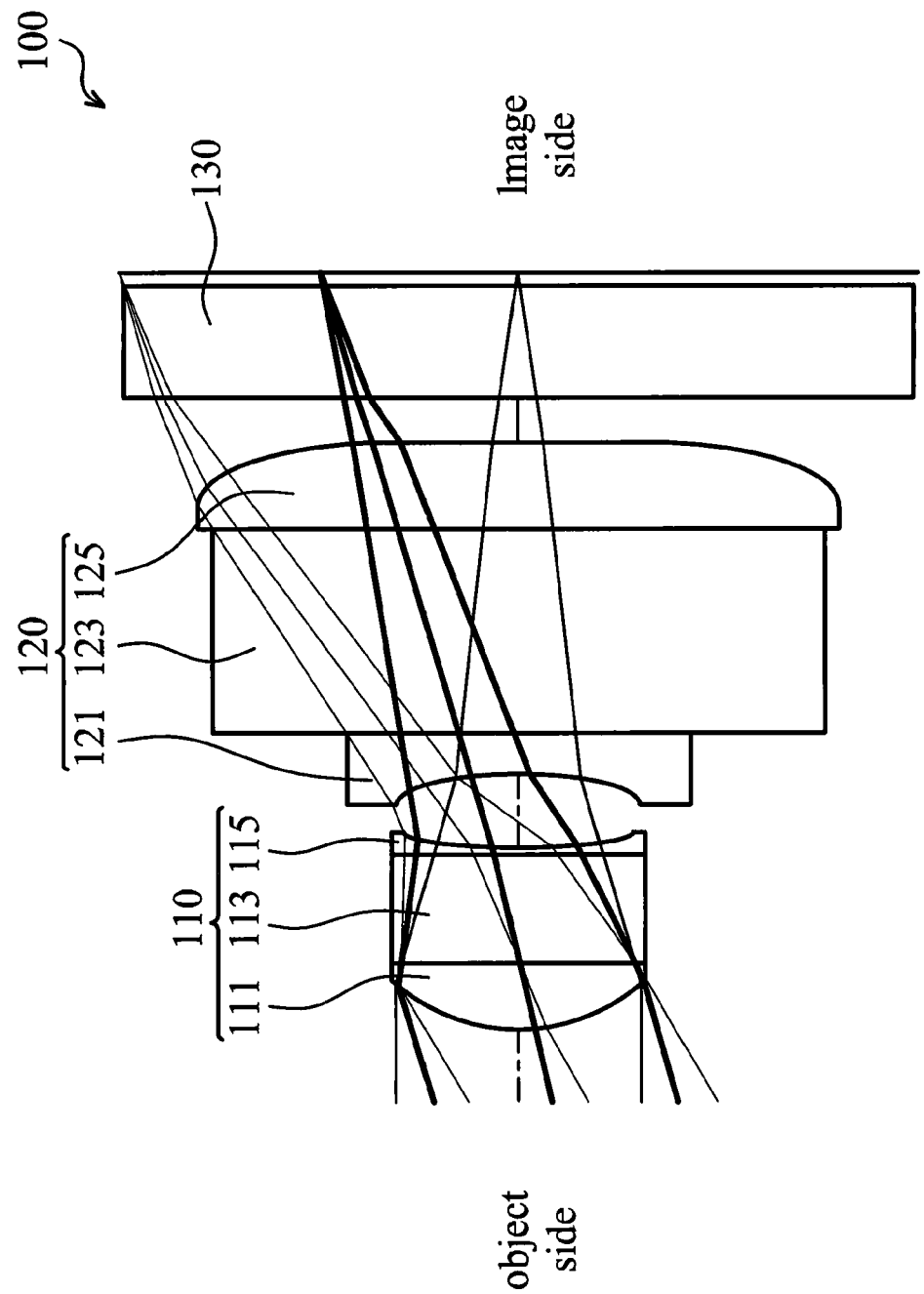
FIG. 2A is a schematic view illustrating a stacked compound lens configuration of a first embodiment of the image capture lens module of the invention.

FIG. 2A is a schematic view illustrating a stacked compound lens configuration of a first embodiment of the image capture lens module of the invention. Referring to FIG. 2A, an image capture lens module 100 with VGA grade resolution comprises a first compound lens 110, a second compound lens 120, and a cover glass 130 for an image sensor arranged in sequence from an object side to an image side. The first compound lens 110 includes a first lens element 111, a second lens element 113, and a third lens element 115 arranged in sequence from an object side to an image side. A second compound lens 120 includes a fourth lens element 121, a fourth lens element 123, and a fifth lens element 125 arranged in sequence from an object side to an image side. An image sensor (not shown) with a cover glass 130 is positioned behind the second compound lens 120. In one embodiment, a curvature radius of the first lens element is positive, a curvature radius of the third lens element is negative, a curvature radius of the fourth lens element is negative, and a curvature radius of the sixth lens element is negative. In another embodiment, an abbe number of the first lens element exceeds 55 and an abbe number of the third lens element is less than 30.

The six lens elements 111, 113, 115, 121, 123, and 125 of the first embodiment of the image capture lens module 100 satisfy the following equation:

$$Z = \frac{Cr^2}{1 + \sqrt{1 - (1+k)C^2r^2}} + \sum_{i=1}^{N} A_i r^i$$

where:
Z is the length of a line drawn from a point on the aspheric lens surface art a distance r from the optical axis to the tangential plane of the aspheric surface vertex,
C is the curvature (1/the radius of curvature, R) of the aspheric lens surface near the optical axis,
r is the distance from the optical axis,
k is the eccentricity, and
$A_i$ is the $i^{th}$ aspheric coefficient.

Figure 2B:
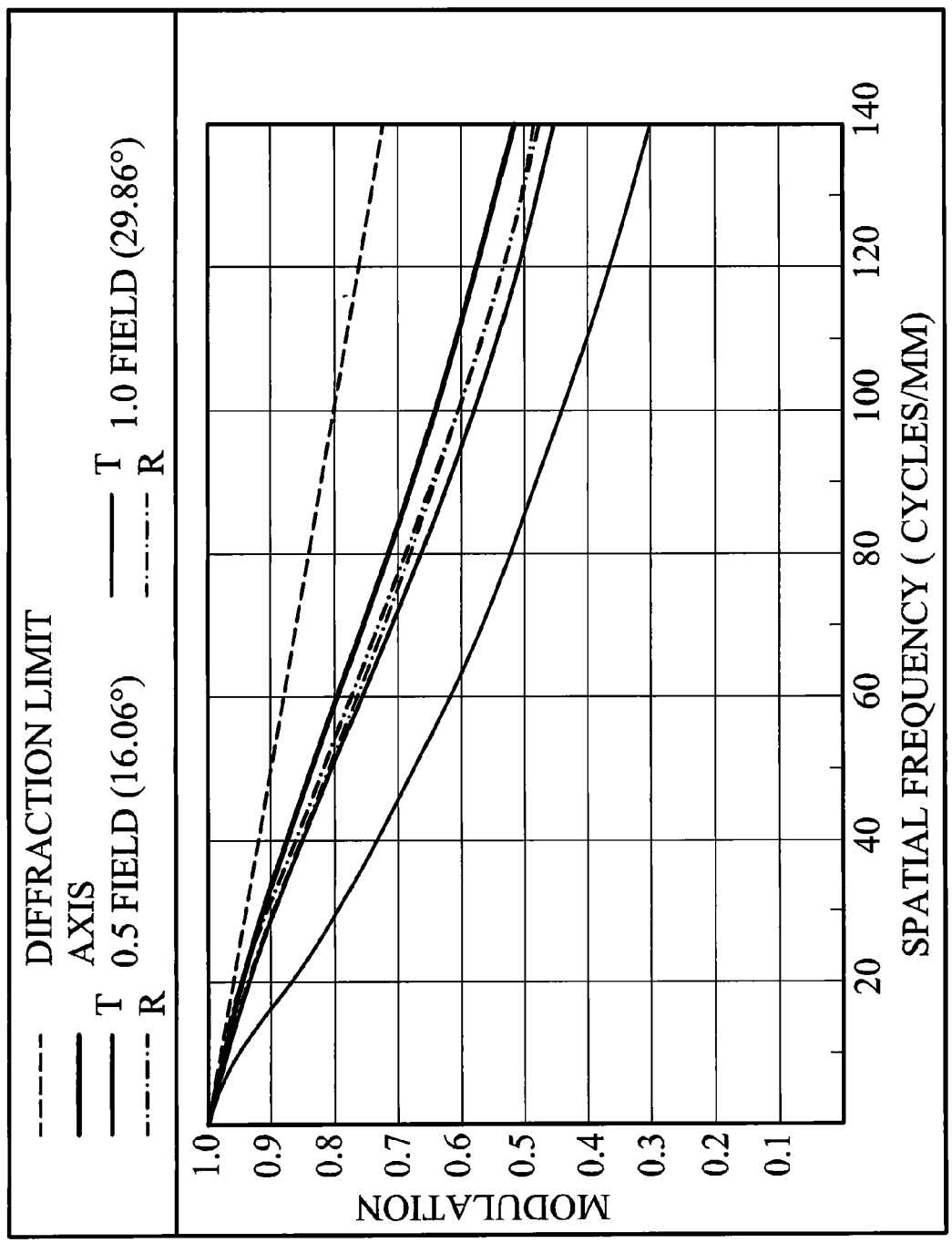
FIG. 2B is a graph showing improved modulation distribution along the spatial frequency of a first embodiment of the image capture lens module focused on the CMOS image sensor chip.
Figure 2C:
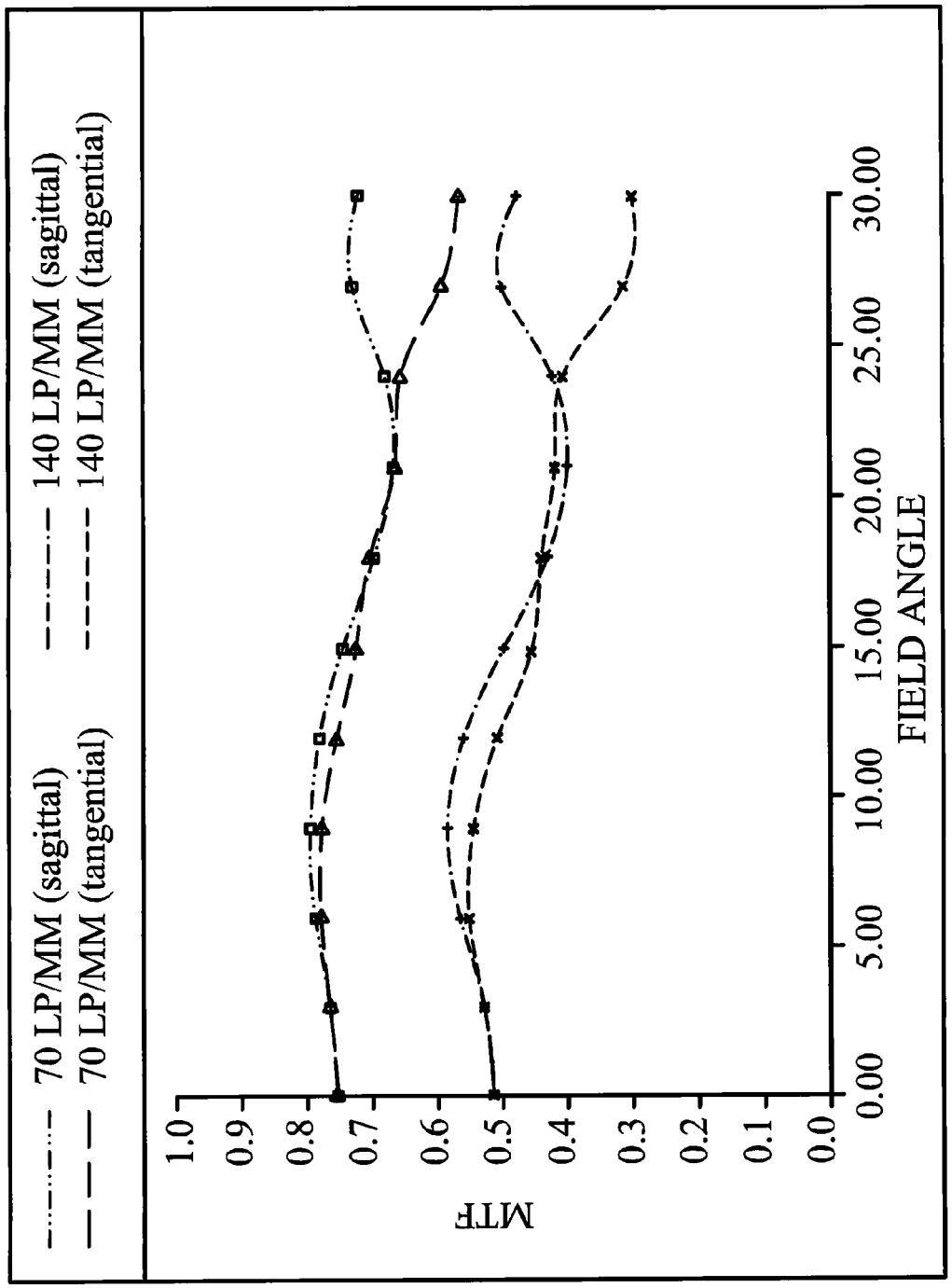
FIG. 2C is a graph showing a first embodiment of the image capture lens module having significantly higher MTF values (both at 70 lp/mm and 140 lp/mm) and respectively indicating the tangential (T) and sagittal (S) simulation data.

Alternatively, the object side of the first lens element and the image side of the third lens element are aspherical, and the object side of the fourth lens element and the image side of the sixth lens element are aspherical. The stimulated light paths of the first embodiment are also illustrated in FIG. 2A. The focused image on the CMOS image sensor chip has improved modulation distribution along the spatial frequency as shown in FIG. 2B. Lens MTF curves are plotted at a specified level of detail expressed in cycles per millimeter. Accordingly, the image capture lens module 100 of the first embodiment has significantly higher MTF values (both at 70 lp/mm and 140 lp/mm). The tangential (T) and sagittal (S) measurement sections are respectively indicated, as shown in FIG. 2C.

Table I-1 shows the value of Ri (i=1, 2, 3, ..., 11) of the curvature radius on the optical axis, thickness Ti (i=1, 2, 3, ..., 11) and refraction index and Abbe number of the lens composing materials of the first embodiment of the image capture lens module 100. Table I-2 shows aspherical surface coefficient of the lens composing materials of the first embodiment of the image capture lens module 100.

TABLE I-1

| surface | R | Thickness | Nd | vd |
|---|---|---|---|---|
| S1 | 0.827401599 | 0.28 | 1.515 | 56 |
| S2 | ∞ | 0.5 | 1.516 | 62.6 |
| S3 | ∞ | 0.025 | 1.596 | 295 |
| S4 | 2.60157704 | 0.327522488 | | |
| S5 | −2.371180719 | 0.189580412 | 1.596 | 295 |
| S6 | ∞ | 0.9 | 1.516 | 62.6 |
| S7 | ∞ | 0.38502141 | 1.596 | 295 |
| S8 | 25.44127032 | 0.2 | | |
| S9 | ∞ | 0.5 | 1.52 | 60 |
| S10 | ∞ | 0.049 | | |
| S11 | ∞ | 0 | | |

TABLE I-2

| surface | K | A2 | A4 | A6 | A8 | A10 | A12 | A14 |
|---|---|---|---|---|---|---|---|---|
| S1 | 0.82740 | −0.76727 | 0.17087 | 0.13369 | 0.182595 | 0.46112 | | |
| S2 | | | | | | | | |
| S3 | 2.60158 | 22.07637 | −0.02275 | 0.23292 | −1.01363 | 1.840486 | | |
| S4 | | | | | | | | |
| S5 | −2.37118 | 0 | −0.55893 | 1.22802 | −14.2270 | 44.90806 | −50.3873 | −85.0274 |
| S6 | | | | | | | | |
| S7 | 25.44127 | 7.00271 | −0.07828 | 0.08154 | −0.13674 | 0.09356 | −0.03135 | 0.00411 |
| S8 | | | | | | | | |

In another embodiment, the following relations are further satisfied:

$$0.5 < |EFL_{g1}/EFL_{g1g2}| < 0.8,$$

where:

$EFL_{g1}$: is effective focal length of the first compound lens; and $EFL_{g1g2}$: is effective focal length of the first and second compound lens.

Figure 3A:
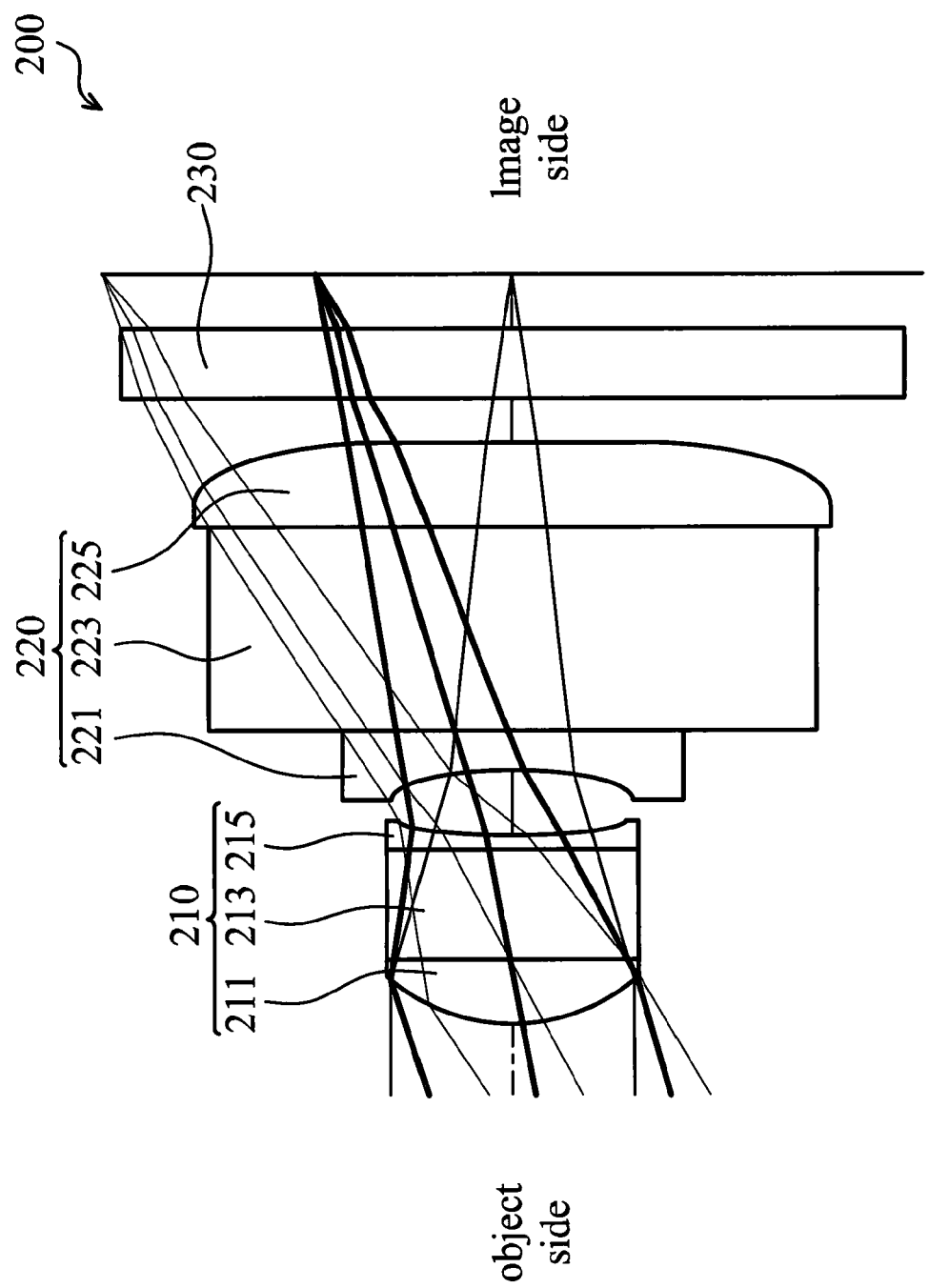
FIG. 3A is a schematic view illustrating a stacked compound lens configuration of a second embodiment of the image capture lens module of the invention.

FIG. 3A is a schematic view illustrating a stacked compound lens configuration of a second embodiment of the image capture lens module of the invention. Referring to FIG. 3A, an image capture lens module 200 comprises a first compound lens 210, a second compound lens 220, and a cover glass 230 for an image sensor arranged in sequence from an object side to an image side. The first compound lens 210 includes a first lens element 211, a second lens element 213, and a third lens element 215 arranged in sequence from an object side to an image side. A second compound lens 220 includes a fourth lens element 221, a fourth lens element 223, and a fifth lens element 225 arranged in sequence from an object side to an image side. An image sensor (not shown) with a cover glass 330 is positioned behind the second compound lens 220. In one embodiment, a curvature radius of the first lens element is positive, a curvature radius of the third lens element is negative, a curvature radius of the fourth lens element is negative, and a curvature radius of the sixth lens element is negative. In another embodiment, an abbe number of the first lens element exceeds 55 and an abbe number of the third lens element is less than 30.

The six lens elements 211, 213, 215, 221, 223, and 225 of the second embodiment of the image capture lens module 200 satisfy the following equation:

$$Z = \frac{Cr^2}{1 + \sqrt{1 - (1+k)C^2r^2}} + \sum_{i=1}^{N} A_i r^i$$

where:

Z is the length of a line drawn from a point on the aspheric lens surface art a distance r from the optical axis to the tangential plane of the aspheric surface vertex, C is the curvature (1/the radius of curvature, R) of the aspheric lens surface near the optical axis, r is the distance from the optical axis, k is the eccentricity, and $A_i$ is the $i^{th}$ aspheric coefficient.

Figure 3B:
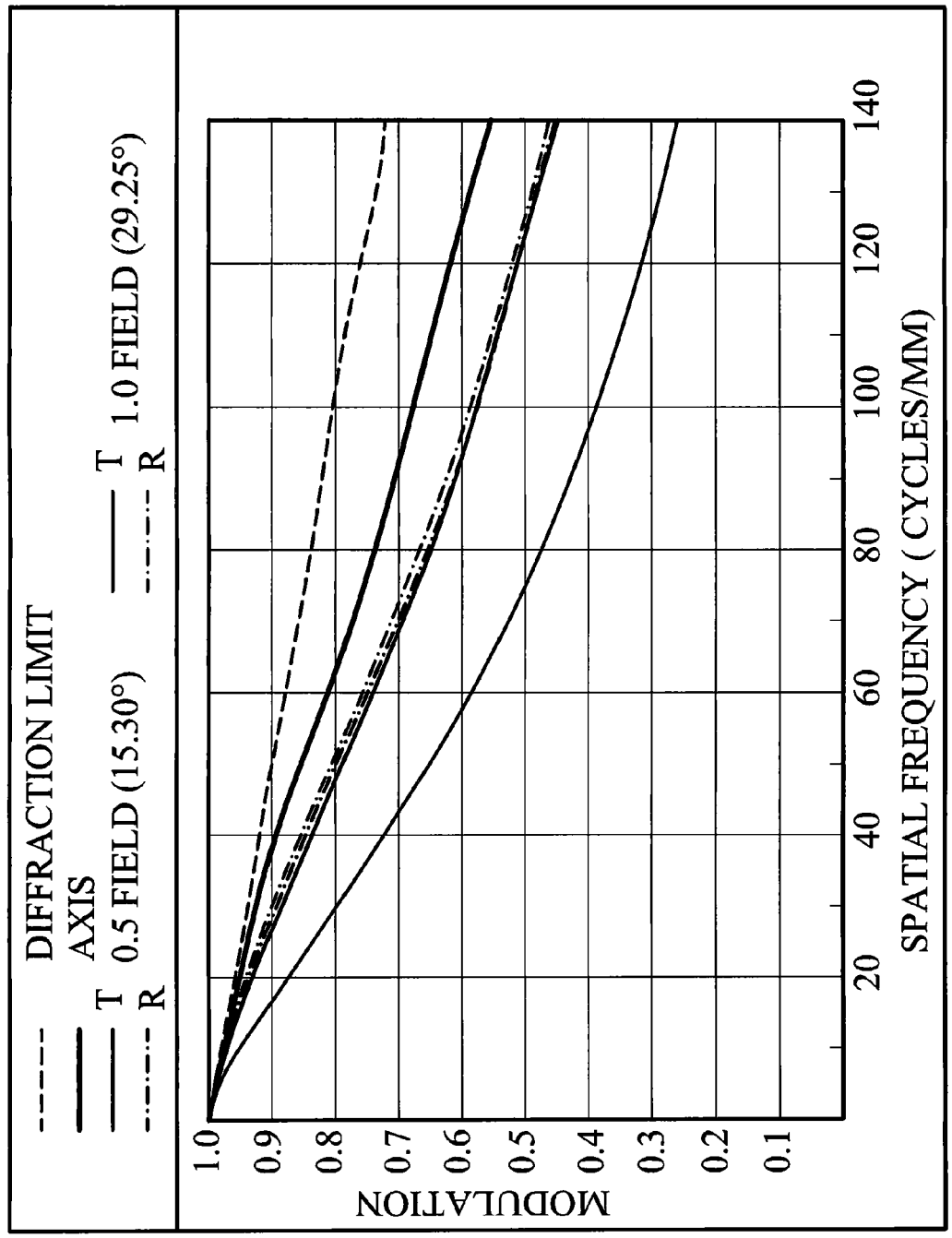
FIG. 3B is a graph showing improved modulation distribution along the spatial frequency of a second embodiment of the image capture lens module focused on the CMOS image sensor chip.
Figure 3C:
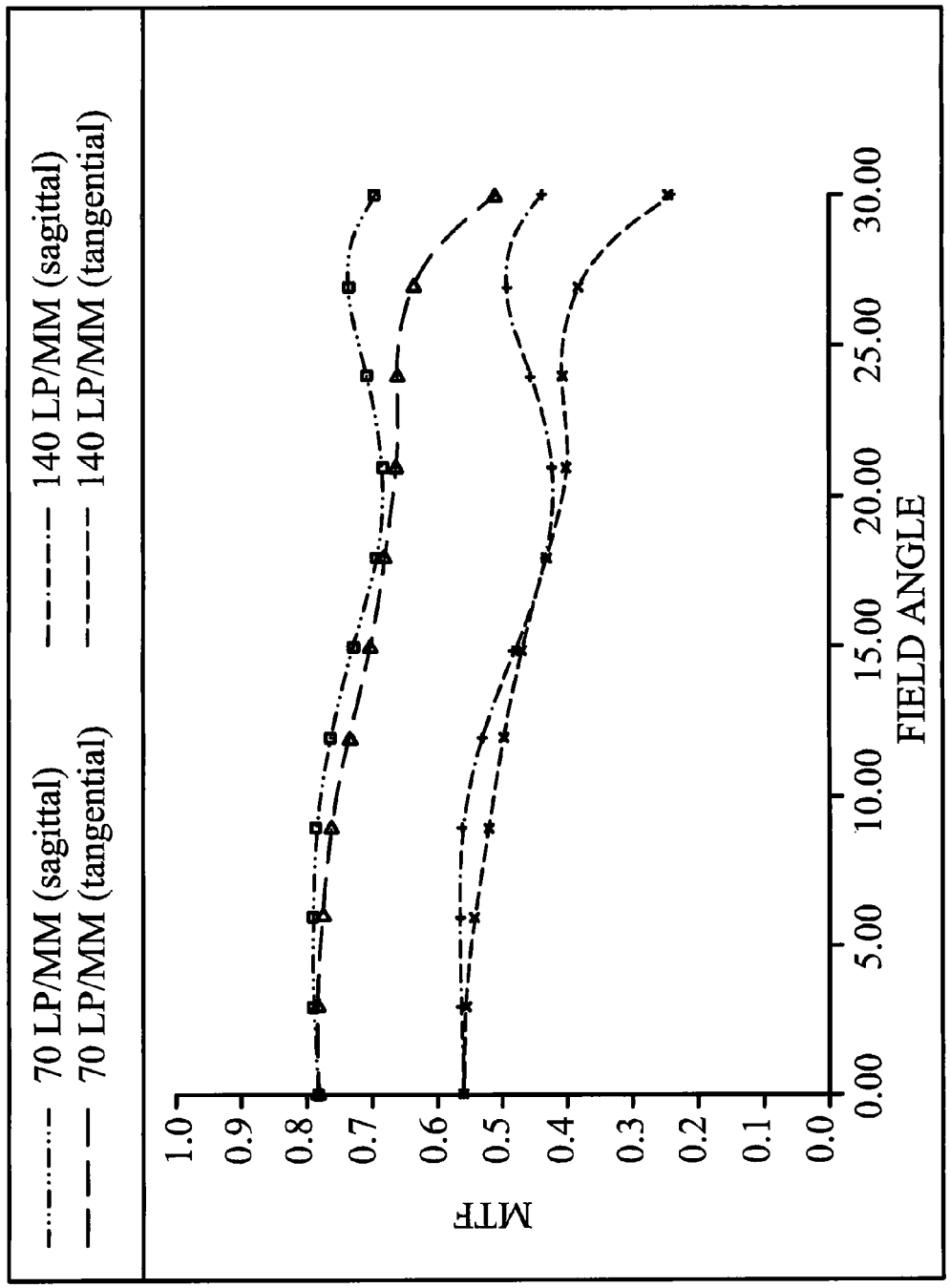
FIG. 3C is a graph showing a second embodiment of the image capture lens module having significantly higher MTF values (both at 70 lp/mm and 140 lp/mm) and respectively indicating the tangential (T) and sagittal (S) simulation data.

Alternatively, the object side of the first lens element and the image side of the third lens element are asperical, and the object side of the fourth lens element and the image side of the sixth lens element are asperical. The stimulated light paths of the second embodiment are also illustrated in FIG. 3A. The focused image on the CMOS image sensor chip has improved modulation distribution along the spatial frequency as shown in FIG. 3B. Lens MTF curves are plotted at a specified level of detail expressed in cycles per millimeter. Accordingly, the image capture lens module 200 of the second embodiment has significantly higher MTF values (both at 70 lp/mm and 140 lp/mm). The tangential (T) and sagittal (S) measurement sections are respectively indicated, as shown in FIG. 3C.

Table II-1 shows the value of Ri (i=1, 2, 3, . . . , 11) of the curvature radius on the optical axis, thickness Ti (i=1, 2, 3, . . . , 11) and refraction index and Abbe number of the lens composing materials of the second embodiment of the image capture lens module 200. Table II-1 shows aspherical surface coefficient of the lens composing materials of the second embodiment of the image capture lens module 200.

TABLE II-1

| Surface | R | Thickness | Nd | vd |
|---|---|---|---|---|
| S1 | 0.865061498 | 0.243921129 | 1.472 | 59 |
| S2 | ∞ | 0.7 | 1.516 | 62.6 |
| S3 | ∞ | 0.110772828 | 1.596 | 295 |
| S4 | 4.237668711 | 0.298735586 | | |
| S5 | −2.223361317 | 0.15 | 1.596 | 295 |
| S6 | ∞ | 0.8 | 1.516 | 62.6 |
| S7 | ∞ | 0.38502141 | 1.596 | 295 |
| S8 | 11.70118589 | 0.15 | | |
| S9 | ∞ | 0.3 | 1.52 | 60 |
| S10 | ∞ | 0.282353304 | | |
| S11 | ∞ | 0 | | |

TABLE II-2

| surface | K | A2 | A4 | A6 | A8 | A10 | A12 | A14 |
|---|---|---|---|---|---|---|---|---|
| S1 | 0.865062 | 0.760089 | 0.121872 | 0.073816 | 0.116174 | 0.140321 | | |
| S2 | | | | | | | | |
| S3 | 4.237669 | 52.16469 | −0.049867 | 0.193086 | −0.402285 | 0.195662 | | |
| S4 | | | | | | | | |
| S5 | −2.223361 | 0 | −0.536059 | 0.246046 | −3.222015 | −7.360828 | 64.9565 | −150.003 |
| S6 | | | | | | | | |
| S7 | 11.70119 | 0 | −0.065606 | −0.048009 | 0.059765 | −0.047822 | 0.017815 | −0.002672 |
| S8 | | | | | | | | |

Figure 4A:
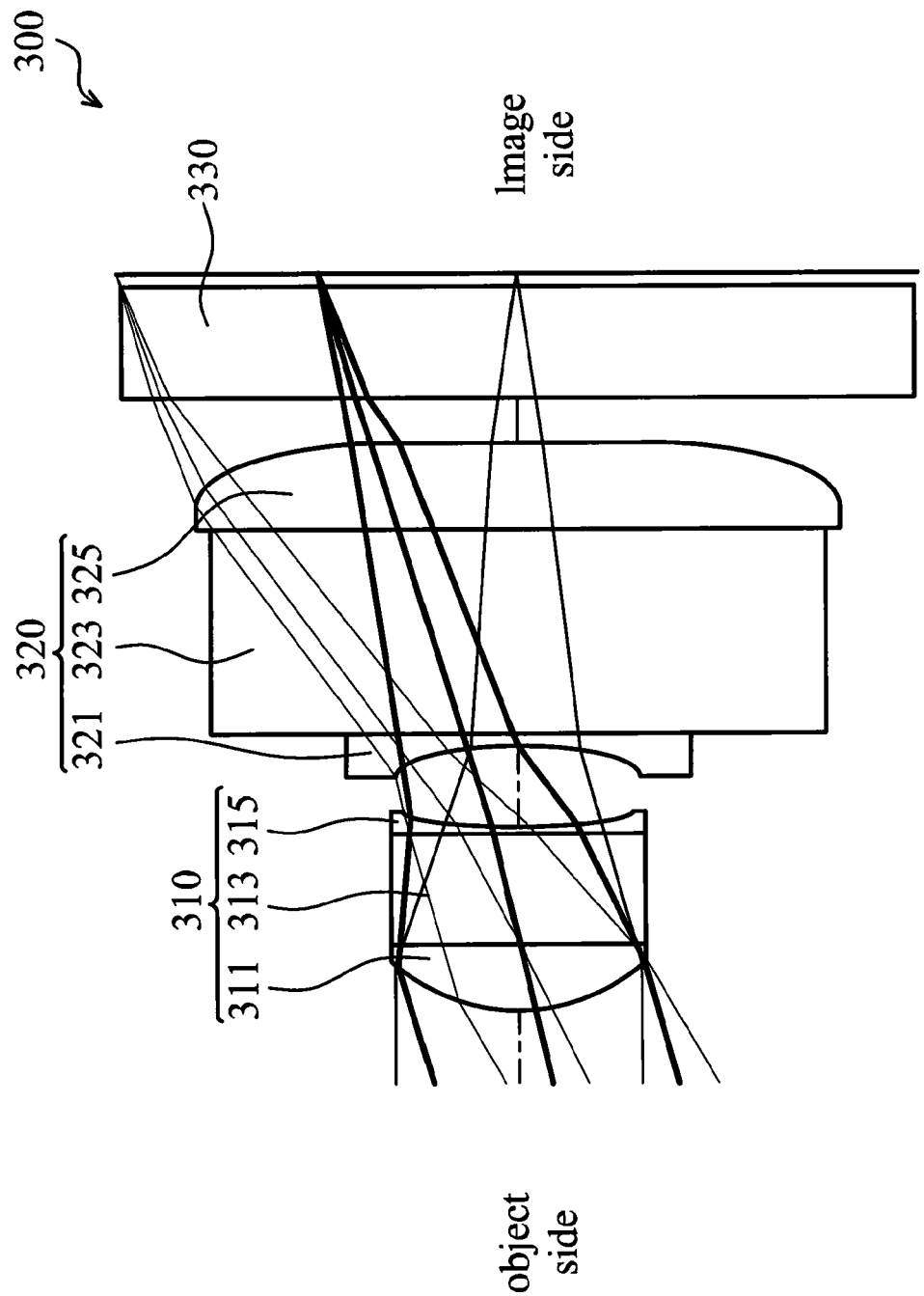
FIG. 4A is a schematic view illustrating a stacked compound lens configuration of a third embodiment of the image capture lens module of the invention.

FIG. 4A is a schematic view illustrating a stacked compound lens configuration of a third embodiment of the image capture lens module of the invention. Referring to FIG. 4A, an image capture lens module 300 comprises a first compound lens 310, a second compound lens 320, and a cover glass 330 for an image sensor arranged in sequence from an object side to an image side. The first compound lens 310 includes a first lens element 311, a second lens element 313, and a third lens element 315 arranged in sequence from an object side to an image side. A second compound lens 320 includes a fourth lens element 321, a fourth lens element 323, and a fifth lens element 325 arranged in sequence from an object side to an image side. An image sensor (not shown) with a cover glass 330 is positioned behind the second compound lens 320. In one embodiment, a curvature radius of the first lens element is positive, a curvature radius of the third lens element is negative, a curvature radius of the fourth lens element is negative, and a curvature radius of the sixth lens element is negative. In another embodiment, an abbe number of the first lens element exceeds 55 and an abbe number of the third lens element is less than 30.

The six lens elements 311, 313, 315, 321, 323, and 325 of the third embodiment of the image capture lens module 300 satisfy the following equation:

$$Z = \frac{Cr^2}{1 + \sqrt{1-(1+k)C^2r^2}} + \sum_{i=1}^{N} A_i r^i$$

where:

Z is the length of a line drawn from a point on the aspheric lens surface art a distance r from the optical axis to the tangential plane of the aspheric surface vertex, C is the curvature (1/the radius of curvature, R) of the aspheric lens surface near the optical axis, r is the distance from the optical axis, k is the eccentricity, and $A_i$ is the $i^{th}$ aspheric coefficient.

Figure 4B:
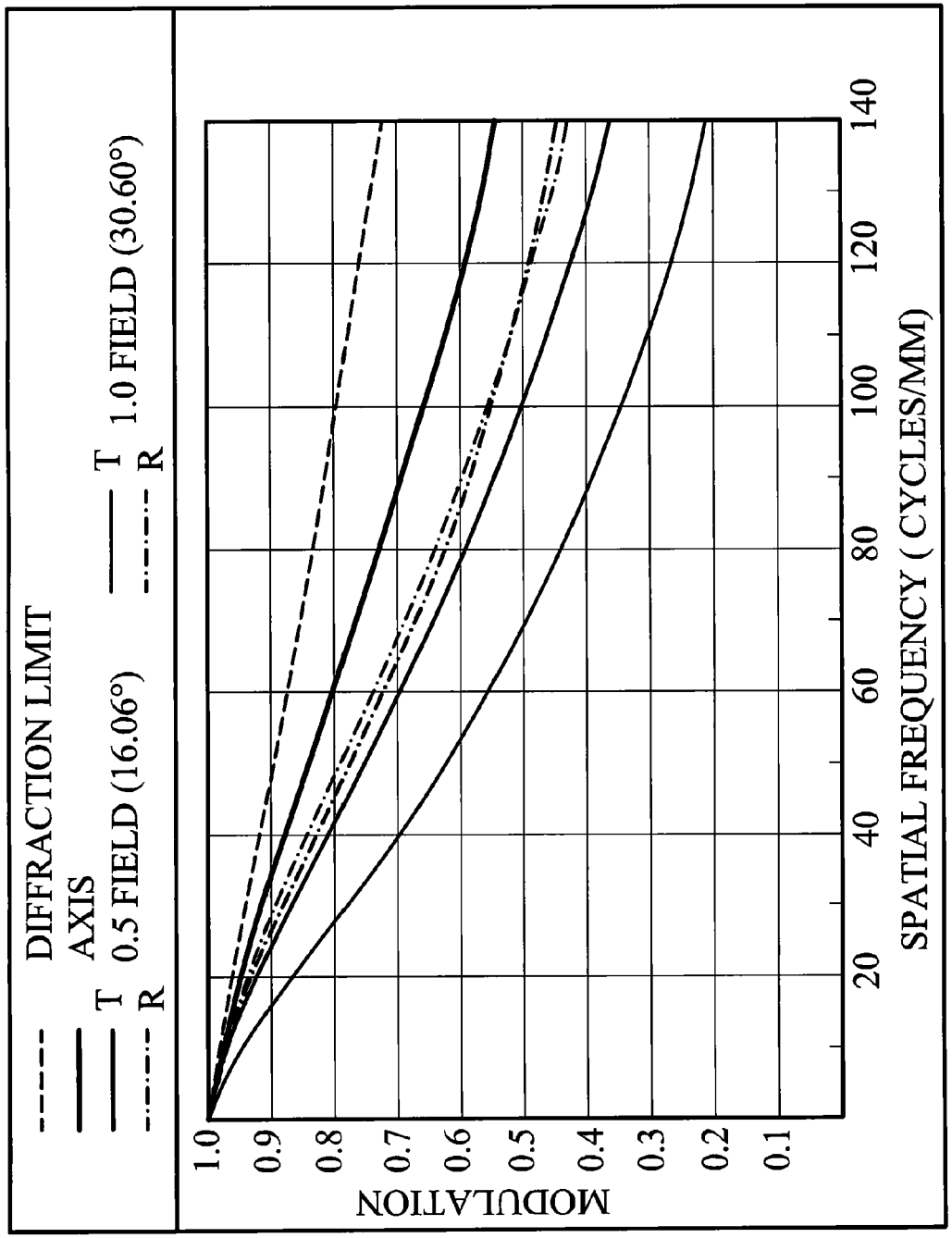
FIG. 4B is a graph showing improved modulation distribution along the spatial frequency of a third embodiment of the image capture lens module focused on the CMOS image sensor chip.
Figure 4C:
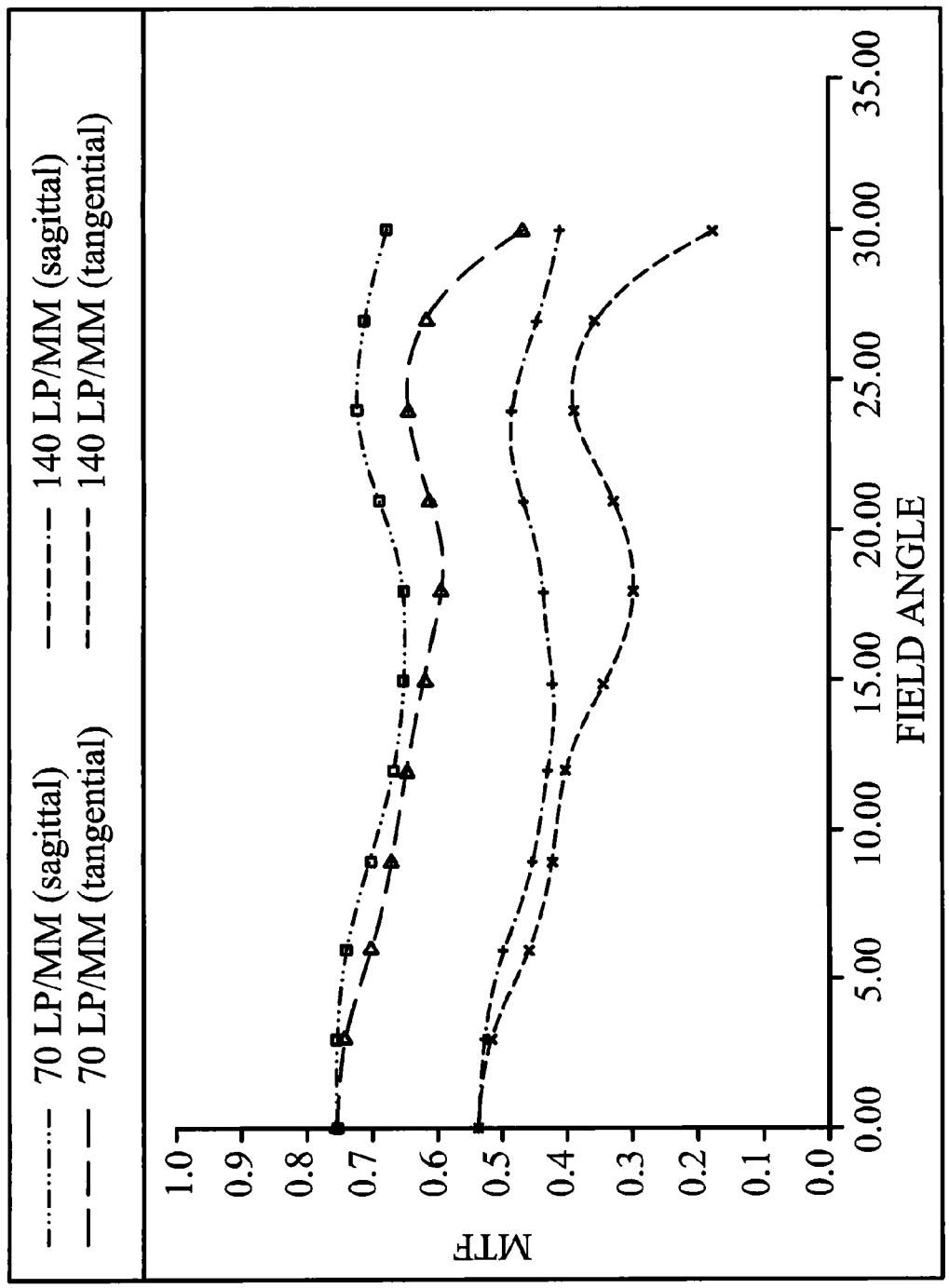
FIG. 4C is a graph showing a third embodiment of the image capture lens module having significantly higher MTF values (both at 70 lp/mm and 140 lp/mm) and respectively indicating the tangential (T) and sagittal (S) simulation data.

Alternatively, the object side of the first lens element and the image side of the third lens element are asperical, and the object side of the fourth lens element and the image side of the sixth lens element are asperical. The stimulated light paths of the third embodiment are also illustrated in FIG. 4A. The focused image on the CMOS image sensor chip has improved modulation distribution along the spatial frequency as shown in FIG. 4B. Lens MTF curves are plotted at a specified level of detail expressed in cycles per millimeter. Accordingly, the image capture lens module 300 of the third embodiment has significantly higher MTF values (both at 70 lp/mm and 140 lp/mm). The tangential (T) and sagittal (S) measurement sections are respectively indicated, as shown in FIG. 4C.

Table III-1 shows the value of Ri (i=1, 2, 3, . . . , 11) of the curvature radius on the optical axis, thickness Ti (i=1, 2, 3, . . . , 11) and refraction index and Abbe number of the lens composing materials of the third embodiment of the image capture lens module. Table III-1 shows aspherical surface coefficient of the lens composing materials of the third embodiment of the image capture lens module.

TABLE III-1

| Surface | R | Thickness | Nd | Vd |
|---|---|---|---|---|
| S1 | 0.90564182 | 0.28 | 1.511 | 57 |
| S2 | ∞ | 0.7 | 1.516 | 62.6 |
| S3 | ∞ | 0.025 | 1.596 | 295 |
| S4 | 2.918080373 | 0.325862511 | | |
| S5 | −3.621744275 | 0.025 | 1.596 | 295 |
| S6 | ∞ | 0.8 | 1.516 | 62.6 |
| S7 | ∞ | 0.385 | 1.596 | 295 |
| S8 | 4.937975298 | 0.25 | | |
| S9 | ∞ | 0.5 | 1.52 | 60 |
| S10 | ∞ | 0.038957922 | | |
| S11 | ∞ | 0 | | |

TABLE III-2

| surface | K | A2 | A4 | A6 | A8 | A10 | A12 | A14 |
|---|---|---|---|---|---|---|---|---|
| S1 | 0.90564 | −0.7573 | 0.10950 | 0.05097 | 0.25945 | −0.21829 | | |
| S2 | | | | | | | | |
| S3 | 2.91808 | −21.005 | 0.06048 | 1.25031 | −4.47460 | 9.34938 | | |
| S4 | | | | | | | | |
| S5 | −3.6217 | 0 | −0.64324 | 0.93980 | −3.83695 | −7.29161 | 55.00058 | −103.79062 |
| S6 | | | | | | | | |
| S7 | 4.93798 | 0 | −0.16396 | 0.10583 | −0.11220 | 0.05372 | −0.01406 | 0.00139 |
| S8 | | | | | | | | |

Note that the second lens element and the fifth lens element can comprise high refraction index wafer-level substrates. For example, refraction indices of the wafer-level substrates approximately exceed 1.6, and the abbe number of the wafer-level substrates is less than 35. In one embodiment, the wafer-level substrates of the second lens element and the fifth lens element can be made of lanthanum dense flint (LaSF), lanthanum flint (LaF), barium dense flint (BaSF), flint (F), and other suitable optical materials. The first, the third, the fourth, and the sixth lens elements can comprise reflowable and VU-curable materials such as a transparent curable silicone resin, or a thermosetting resin material. For example, the first and the third lens elements can be fabricated in an array form on both sides of a wafer-level second lens element. The fourth and the sixth lens elements can be fabricated in an array form on both sides of a wafer-level fifth lens element. The first, the third, the fourth, and the sixth lens elements can be formed by molding or other techniques such as lithography. The first, the third, the fourth, and the sixth lens elements can be directly formed on the second and the fifth lens elements respectively, or indirectly bond by adhesive layers.

Figure 5:
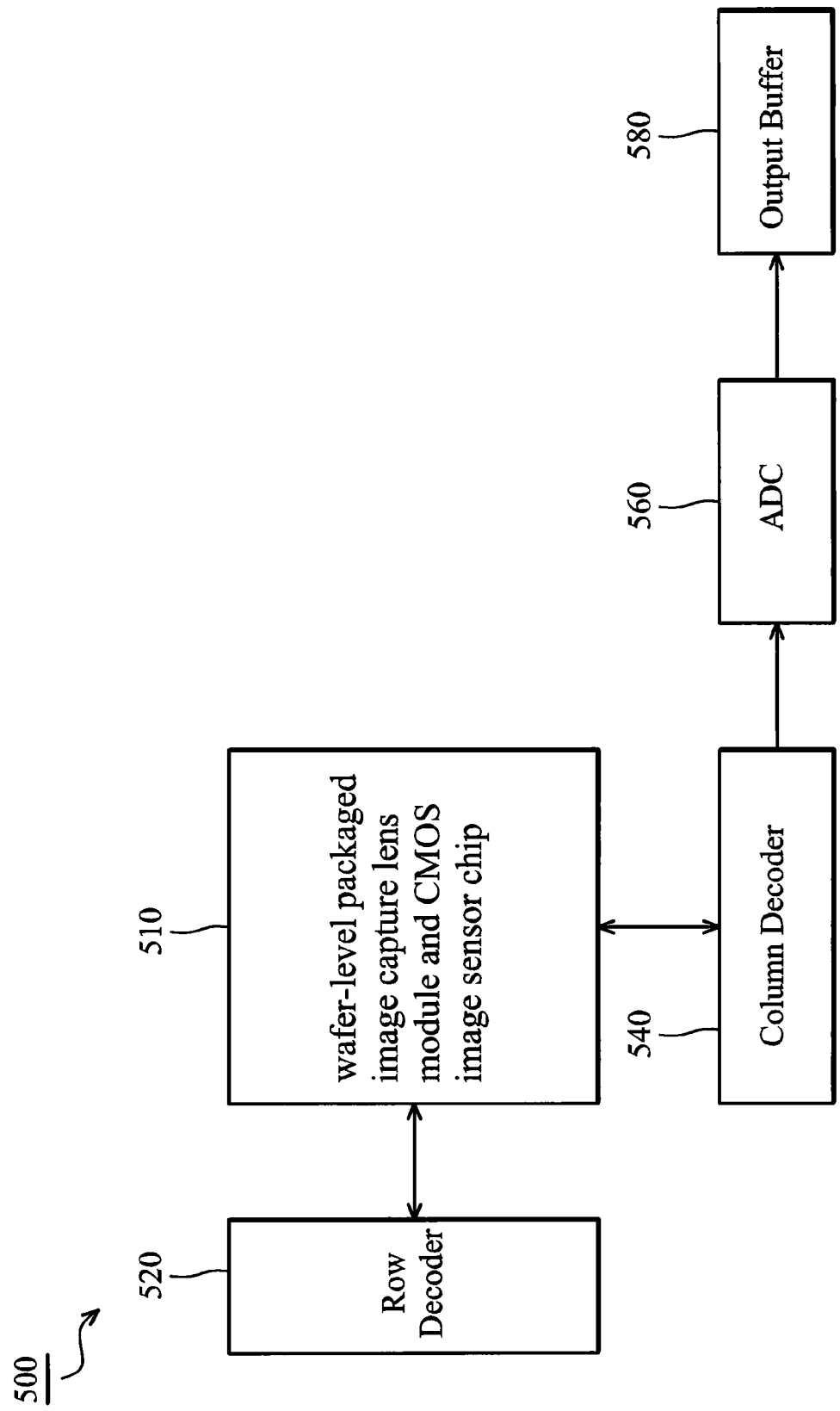
FIG. 5 shows a block diagram illustrating an embodiment of an image capture system of the invention.

In further another embodiment of the invention, an image capture system including a wafer-level packaged image capture lens module 100, 200, or 300 and CMOS image sensor chip is provided. For example, the image capture system is directed to a mobile phone with digital still camera (DSC) applications. The wafer-level packaged image capture lens module and CMOS image sensor chip can easily be integrated with other peripheral units, such as a row decoder and a column decoder, an analog to digital converter (ADC), and a digital signal processor to form a system on a silicon chip. FIG. 5 shows a block diagram illustrating an embodiment of an image capture system 500. The image capture system 500 comprises a wafer-level packaging 510 of an image capture lens module 100, 200 or 300 and a CMOS image sensor chip. A row decoder 520 and a column decoder 540 are used to address any one or multiple pixels and retrieve data from selected pixels. An ADC 560 is coupled to column decoder 540 to receive the analog signal and convert the analog signal into a digital signal. An output buffer 580 is connected to ADC to store digital signal converted by the ADC.

In order to reduce height of the wafer level packaged imaging lens module, high refraction index substrates (e.g., refractive index exceeding 1.6) are used while maintaining high optical performances. Accordingly, the optical length of the lens module can be short enough to be installed in a portable telephone or the like. The height of the image capture lens module is reduced when compared to prior art.

While the invention has been described by way of example and in terms of exemplary embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture lens module, comprising:
   a first compound lens with a first lens element, a second lens element, and a third lens element arranged in sequence from an object side to an image side;
   a second compound lens with a fourth lens element, a fifth lens element, and a sixth lens element arranged in sequence from an object side to an image side; and
   a spacer between the first compound lens and the second compound lens,
   wherein a curvature radius of the first lens element is positive, a curvature radius of the third lens element is negative, a curvature radius of the fourth lens element is negative, and a curvature radius of the sixth lens element is negative,
   wherein an abbe number of the first lens element exceeds 55 and an abbe number of the third lens element is less than 30, and
   wherein the following relations are further satisfied:

$$0.5 < |EFL_{g1}/EFL_{g1g2}| \leq 0.8,$$

where:
   $EFL_{g1}$: is effective focal length of the first compound lens; and
   $EFL_{g1g2}$: is effective focal length of the first and second compound lens.

2. The image capture lens module according to claim 1, wherein the second lens element and the fifth lens element comprise high refraction index wafer-level substrates.

3. The image capture lens module according to claim 1, wherein the first, the third, the fourth, and the sixth lens elements comprise reflowable and VU curable polymer compounds.

4. The image capture lens module according to claim 1, wherein:
   the first lens element is a plano-convex lens with a convex surface facing the object side on the paraxial line;
   the second lens element is an optical-parallel plate;
   the third lens element is a plano-concave lens with a concave surface facing the image side on the paraxial line;
   the fourth lens element is a plano-concave lens with a concave surface facing the object side on the paraxial line;
   the fifth lens element is an optical-parallel plate; and
   the sixth lens element is a plano-concave lens with a concave surface facing the image side on the paraxial line.

5. The image capture lens module according to claim 1, further comprising a cover glass for an image sensor positioned behind the second compound lens, wherein the first compound lens, the second compound lens and the cover glass are arranged in sequence from an object side to an image side.

6. An image capture system, comprising:
   a wafer-level packaged image capture lens module and a CMOS image sensor chip, wherein the image capture lens module comprises:
   a first compound lens with a first lens element, a second lens element, and a third lens element arranged in sequence from an object side to an image side;
   a second compound lens with a fourth lens element, a fifth lens element, and a sixth lens element arranged in sequence from an object side to an image side;
   a spacer between the first compound lens and the second compound lens; and
   a cover glass for an image sensor positioned behind the second compound lens, wherein the first compound lens, the second compound lens and the cover glass are arranged in sequence from an object side to an image side;
   a row decoder and a column decoder coupled to the image sensor device respectively to address one or multiple pixels and to retrieve data from selected pixels;
   an analog-to-digital converter (ADC) coupled to the column decoder, operating to convert the analog electrical representation into a digital image; and
   an output buffer configured to store digital image data converted by the analog-to-digital converter
   wherein a curvature radius of the first lens element is positive, a curvature radius of the third lens element is negative, a curvature radius of the fourth lens element is negative, and a curvature radius of the sixth lens element is negative,
   wherein an abbe number of the first lens element exceeds 55 and an abbe number of the third lens element is less than 30, and
   wherein the following relations are further satisfied:

$$0.5 \leq |EFL_{g1}/EFL_{g1g2}| \leq 0.8,$$

where:
   $EFL_{g1}$: is effective focal length of the first compound lens; and
   $EFL_{g1g2}$: is effective focal length of the first and second compound lens.

7. The image capture system according to claim 6, wherein the second lens element and the fifth lens element comprise high refraction index wafer-level substrates.

8. The image capture system according to claim 6, wherein the first, the third, the fourth, and the sixth lens elements comprise reflowable and VU curable polymer compounds.

9. The image capture system according to claim 6, wherein:
   the first lens element is a plano-convex lens with a convex surface facing the object side on the paraxial line;
   the second lens element is an optical-parallel plate;
   the third lens element is a plano-concave lens with a concave surface facing the image side on the paraxial line;
   the fourth lens element is a plano-concave lens with a concave surface facing the object side on the paraxial line;
   the fifth lens element is an optical-parallel plate; and
   the sixth lens element is a plano-concave lens with a concave surface facing the image side on the paraxial line.

* * * * *